(12) United States Patent
Moradi et al.

(10) Patent No.: US 10,912,059 B2
(45) Date of Patent: Feb. 2, 2021

(54) SYSTEMS, DEVICES AND METHODS FOR COMMUNICATING DATA WITH UNMANNED AERIAL VEHICLES USING UNDERLAY BROADCAST CHANNEL

(71) Applicant: Battelle Energy Alliance, LLC, Idaho Falls, ID (US)

(72) Inventors: Hussein Moradi, Idaho Falls, ID (US); Behrouz Farhang, Salt Lake City, UT (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 103 days.

(21) Appl. No.: 16/144,153

(22) Filed: Sep. 27, 2018

(65) Prior Publication Data
US 2019/0327712 A1 Oct. 24, 2019

Related U.S. Application Data

(60) Provisional application No. 62/659,254, filed on Apr. 18, 2018.

(51) Int. Cl.
*H04W 72/00* (2009.01)
*H04B 1/7097* (2011.01)
*B64C 39/02* (2006.01)

(52) U.S. Cl.
CPC ......... *H04W 72/005* (2013.01); *B64C 39/024* (2013.01); *H04B 1/7097* (2013.01); *B64C 2201/12* (2013.01)

(58) Field of Classification Search
CPC ... H04B 1/707; H04B 1/7097; H04W 72/005; H04W 72/042; H04W 72/0453; H04W 72/085; H04W 72/12; H04W 72/1263

USPC .................. 370/252, 329, 331, 335, 328
See application file for complete search history.

(56) References Cited

U.S. PATENT DOCUMENTS

| | | | |
|---|---|---|---|
| 5,177,765 | A | 1/1993 | Holland et al. |
| 8,731,027 | B2 | 5/2014 | Moradi et al. |
| 8,861,571 | B2 | 10/2014 | Moradi et al. |
| 9,369,866 | B2 | 6/2016 | Moradi et al. |
| 2005/0058151 | A1 | 3/2005 | Yeh |
| 2005/0128935 | A1 | 6/2005 | Tang et al. |

(Continued)

FOREIGN PATENT DOCUMENTS

| | | |
|---|---|---|
| CN | 1125026 A | 6/1996 |
| WO | 2015/105702 A1 | 7/2015 |
| WO | 2016/089044 A1 | 6/2016 |

OTHER PUBLICATIONS

International Search Report and Written Opinion received for PCT Patent Application No. PCT/US18/53130, dated Jan. 22, 2019, 13 pages.

(Continued)

*Primary Examiner* — Harun Chowdhury
(74) *Attorney, Agent, or Firm* — TraskBritt

(57) ABSTRACT

An unmanned aerial vehicle (UAV) and base station are disclosed that communicate within a first cell via schedule requests to set up transmission of up-link data. The UAV additionally communicates up-link data via a grant-free underlay broadcast channel to one or more neighboring base stations of the terrestrial cellular network. Transmitters, receivers, related methods are also disclosed for modulation and demodulation of the transmission packets.

20 Claims, 4 Drawing Sheets

(56) References Cited

U.S. PATENT DOCUMENTS

| | | | |
|---|---|---|---|
| 2006/0209767 A1* | 9/2006 | Chae | H04W 52/146 370/335 |
| 2008/0225693 A1 | 9/2008 | Zhang et al. | |
| 2009/0305716 A1 | 12/2009 | Ono | |
| 2011/0242990 A1 | 10/2011 | Simonsson et al. | |
| 2012/0322453 A1* | 12/2012 | Weng | H04W 72/02 455/450 |
| 2013/0064151 A1 | 3/2013 | Mujtaba et al. | |
| 2013/0114518 A1 | 5/2013 | Martin et al. | |
| 2013/0142218 A1 | 6/2013 | Moradi et al. | |
| 2013/0157669 A1 | 6/2013 | Turtinen et al. | |
| 2014/0098663 A1 | 4/2014 | Vos et al. | |
| 2015/0016350 A1 | 1/2015 | Moulsley et al. | |
| 2016/0029407 A1 | 1/2016 | Soldati et al. | |
| 2016/0353453 A1 | 12/2016 | Au et al. | |
| 2017/0078966 A1 | 3/2017 | Chun et al. | |
| 2017/0135116 A1* | 5/2017 | Kuchibhotla | H04W 72/0446 |
| 2017/0155443 A1* | 6/2017 | Haziza | H04B 1/707 |
| 2017/0359827 A1 | 12/2017 | Kim et al. | |
| 2018/0092104 A1* | 3/2018 | Sheng | H04W 72/085 |
| 2018/0176903 A1 | 6/2018 | Lee et al. | |
| 2019/0116007 A1* | 4/2019 | Yi | H04W 72/0453 |
| 2019/0222343 A1* | 7/2019 | Park | H04W 72/1263 |
| 2019/0246378 A1* | 8/2019 | Islam | H04W 72/042 |

OTHER PUBLICATIONS

Morelli et al., "A comparison of pilot-aided channel estimation methods for OFDM systems", IEEE Transactions on Signal Processing, vol. 49, No. 12, (Dec. 2001) pp. 3065-3073.

Lim et. al, "Performance Analysis of Self-Interference Cancellation in Full-Duplex Large—Scale MIMO Systems", arxiv.org (Apr. 2016) 6 pages.

Bharadia et al., "Full-duplex radios", SIGCOMM'13, Hong Kong, China (Aug. 2013) 12 pages.

3GPP, TR 36.814, v.9.0.0, "Further advancements for E-UTRA physical layer aspects (Release 9)" (Mar. 2010) 107 pages.

3GPP TR 36.881 v1.0.0, "Study on latency reduction techniques for LTE", (May 2016), 98 pages.

Idaho National Laboratory: "Ultra-Low Latency Scheduling-based UL Access", 3GPP Draft; R1-166493, 3rd Generation Partnership Project (3GPP), Mobile Competence Centre ; 650, Route Des Lucioles ; F-06921 Sophia-Antipolis Cedex ; France val. RAN WG1, No. Gothenburg, Sweden; Aug. 22, 2016-Aug. 26, 2016 Aug. 12, 2016 (Aug. 12, 2016).

Idaho National Laboratory: "Underlay Common Control Channel for Unlicensed Spectrum Access and Underlay Low-Rate Data Channel for Licensed Spectrum", 3GPP Draft; R1-164354, 3rd Generation Partnership Project (3GPP), Mobile Competence Centre ; 650, Route Des Lucioles ; F-06921 Sophia-Antipolis Cedex ; France val. RAN WG1, No. Nanjing, China; May 23, 2016-May 27, 2016 May 13, 2016 (May 13, 2016).

* cited by examiner

SYSTEMS, DEVICES AND METHODS FOR COMMUNICATING DATA WITH UNMANNED AERIAL VEHICLES USING UNDERLAY BROADCAST CHANNEL

CROSS REFERENCE TO RELATED APPLICATIONS

This application claims the benefit under 35 U.S.C. § 119(e) of U.S. Provisional Patent Application Ser. No. 62/659,254, filed Apr. 18, 2018, the disclosure of which is hereby incorporated herein in its entirety by this reference.

This application is related to U.S. patent application Ser. No. 15/670,921, filed Aug. 7, 2017, entitled "DEVICES, BASE STATIONS, AND METHODS FOR COMMUNICATING SCHEDULING REQUESTS VIA AN UNDERLAY CONTROL CHANNEL IN A WIRELESS COMMUNICATION SYSTEM," the disclosure of which is hereby incorporated herein in its entirety by this reference.

STATEMENT REGARDING FEDERALLY SPONSORED RESEARCH OR DEVELOPMENT

This invention was made with government support under Contract No. DE-AC07-05-ID14517 awarded by the United States Department of Energy. The government has certain rights in the invention.

FIELD

Embodiments of the present disclosure relate generally to systems, devices, and methods for communication between an unmanned aerial vehicle and a base station, and more particularly communicating between an unmanned aerial vehicle and a base station over an underlay broadcast channel.

BACKGROUND

Integration of unmanned aerial vehicles (UAVs) that may fly well above the earth, in the current terrestrial wireless cellular communications network can be a challenge. When a UAV is flying above the earth, the uplink (UL) signal from the UAV may be visible by base stations in multiple neighboring cells. As a result, the UAV's UL signal may cause interference when the neighboring cells are providing service to their respective terrestrial user equipment (UE) on the same resources used by the UAV.

To handle this interference scenario, the network may assign orthogonal resources for the UAV transmissions that may be inefficient because multiple cells may not be able to use the resources for their own served UEs. In addition, network coordination among base stations may require real-time exchange of information between the base stations that may either not be achieved due to the unavailability of low-latency backhaul between the base stations. As a result, real-time exchange may be required—otherwise the scheduling information may be obsolete. A conventional approach to avoid the network coordination requirement is to use semi-persistence scheduling (SPS) for the UAV-UE UL transmissions. The SPS is a well-developed concept in Long-Term Evolution (LTE) that is primarily used for applications with deterministic traffic characteristics such as Voice over Internet Protocol (VoIP). When the UAVs are scheduled using SPS resources, the neighboring base stations may be able to predict and estimate the UL interference. The neighboring base stations may measure the UL interference during the UAV first SPS transmission and then avoid the same resources by assuming the subsequent transmissions occur in the SPS resources known to the base stations. This SPS technique, however, works well for only low-traffic scenarios in comparison with the performance in high-traffic scenarios.

BRIEF SUMMARY

In some embodiments, an unmanned aerial vehicle including at least one transmitter is disclosed. The transmitter is configured to communicate with a first base station within a first cell and communicate its uplink (UL) transmission information over an underlay broadcast channel with at least one neighboring base station within another cell. The underlay broadcast channel has a power level below a noise level for a communication spectrum.

In some embodiments, a method of recovering a communication signal from an unmanned aerial vehicle (UAV) is disclosed. The method comprises receiving an incoming signal, detecting an underlay broadcast signal from the incoming signal being received from at least one UAV over a underlay broadcast channel (UBC), and recovering transmitted bits from the at least one UAV responsive to detecting the underlay broadcast signal within the incoming signal.

In some embodiments, a cellular network system is disclosed. The cellular network system comprises at least one unmanned aerial vehicle (UAV), a first base station, and a second base station. The first base station is configured to serve a first cell, and communicate with the at least one UAV and other user equipment (UE) located within the first cell via a scheduling request and grant structure. The second base station is configured to serve a second cell and communicate with the at least one UAV located outside of the second cell over a underlay broadcast channel (UBC) without a scheduling request and grant structure to communicate UBC broadcast signals.

BRIEF DESCRIPTION OF THE DRAWINGS

While the specification concludes with claims particularly pointing out and distinctly claiming what are regarded as embodiments of the present disclosure, various features and advantages of embodiments of the disclosure may be more readily ascertained from the following description of example embodiments of the disclosure when read in conjunction with the accompanying drawings, in which:

DETAILED DESCRIPTION

Figure 1:
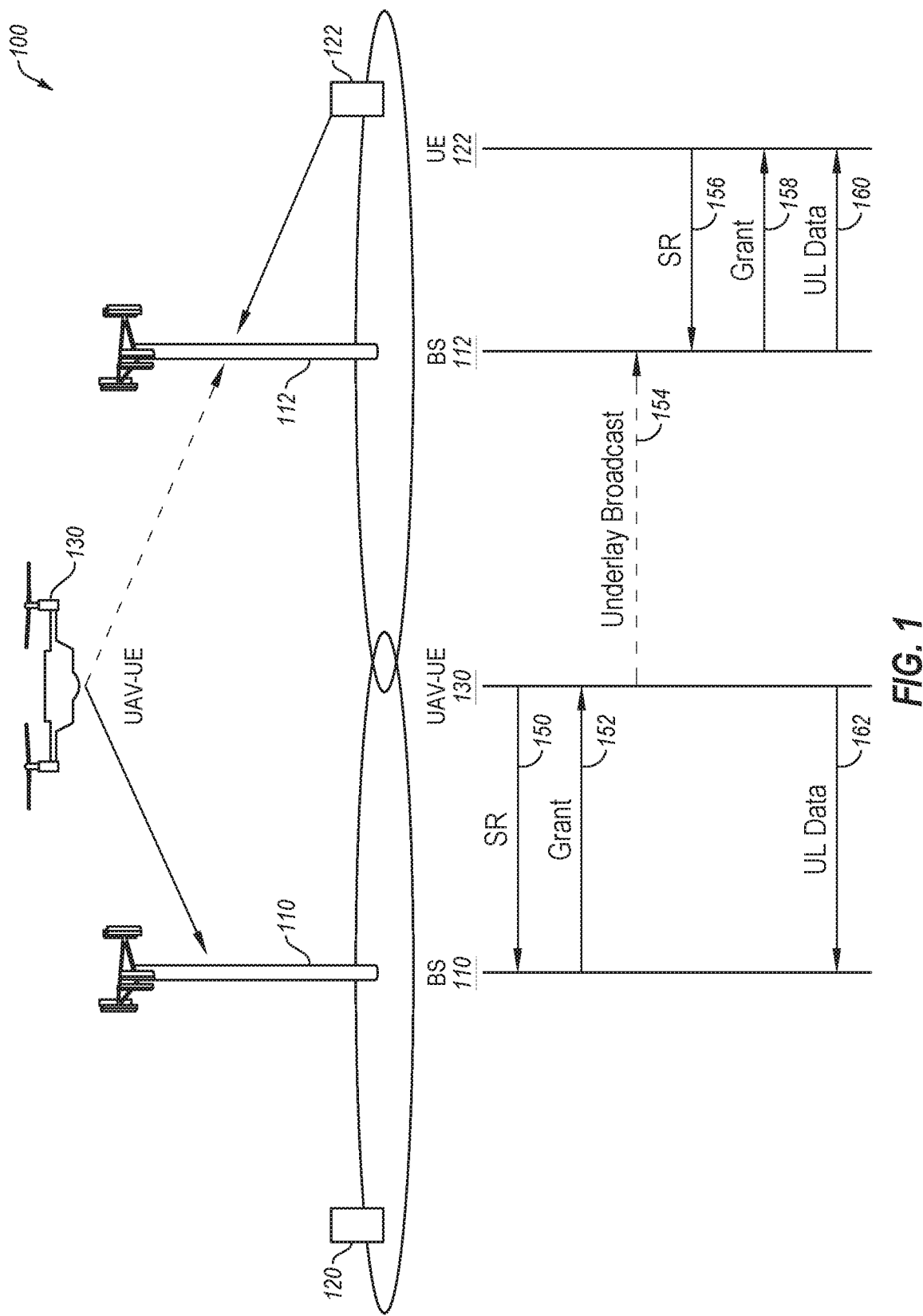
FIG. 1 is a schematic diagram of a communication system for a cellular terrestrial network according to an embodiment of the disclosure.

In the following description, reference is made to the accompanying drawings in which are shown, by way of illustration, specific embodiments in which the disclosure may be practiced. The embodiments are intended to describe aspects of the disclosure in sufficient detail to enable those skilled in the art to make, use, and otherwise practice the invention. Furthermore, specific implementations shown and described are only examples and should not be construed as the only way to implement the present disclosure unless specified otherwise herein. It will be readily apparent to one of ordinary skill in the art that the various embodiments of the present disclosure may be practiced by numerous other partitioning solutions. Other embodiments may be utilized and changes may be made to the disclosed embodiments without departing from the scope of the disclosure. The following detailed description is not to be taken in a limiting sense, and the scope of the present invention is defined only by the appended claims.

In the following description, elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths, and the present disclosure may be implemented on any number of data signals including a single data signal.

The various illustrative logical blocks, modules, and circuits described in connection with the embodiments disclosed herein may be implemented or performed with a general purpose processor, a special purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A general-purpose processor may be considered a special-purpose processor while the general-purpose processor executes instructions (e.g., software code) stored on a computer-readable medium. A processor may also be implemented as a combination of computing devices, e.g., a combination of a DSP and a microprocessor, a plurality of microprocessors, one or more microprocessors in conjunction with a DSP core, or any other such configuration.

Also, it is noted that embodiments may be described in terms of a process that may be depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more instructions or code on computer-readable media. Computer-readable media include both computer storage media and communication media, including any medium that facilitates transfer of a computer program from one place to another.

It should be understood that any reference to an element herein using a designation such as "first," "second," and so forth, does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

Headings are included herein to aid in locating certain sections of detailed description. These headings should not be considered to limit the scope of the concepts described under any specific heading. Furthermore, concepts described in any specific heading are generally applicable in other sections throughout the entire specification.

FIG. 1 is a schematic diagram of a communication system 100 for a cellular terrestrial network according to an embodiment of the disclosure. The communication system 100 includes base stations 110, 112, user equipment 120, 122, and a flying UAV 130. It should be understood that the communication system 100 may have any number of base stations, user equipment and UAVs, and that a limited number are shown in FIG. 1 for simplicity of description. The UAV 130 may include components such as a device electronics housed within an aerial body that includes flight components (e.g., propellers, wings, etc.). The device electronics include components such as memory, a processor, and communication elements (e.g., a transmitter, a receiver, a transceiver, etc.) configured to communicate with one or more base stations as described herein. Likewise, the base stations 110, 112 may each include station electronics such as memory, a processor, and communication elements configured to perform the communication acts with the UAV 130 and the other user equipment (UE) 120, 122.

In this scenario the flying UAV 130 is configured as a UE node (hence, also referred to interchangeably as UAV-UE 130) within the cellular terrestrial network. Like any UE 120, 122 in the network, the UAV-UE 130 may be assigned to a particular cell and be configured to communicate with the respective base station (e.g., base station 110) for that cell. However, as noted above, there may be a difference between a terrestrial UE 120, 122 and a UAV-UE 130 in terms of radio frequency (RF) interference to nearby base stations (e.g., base station 112) of nearby cells. During operation, the signal transmitted by the UAV-UE 130 to base station 110 may be detected by base station 112 (as well as other nearby BSs).

Embodiments of the disclosure include systems, base stations, devices, and related methods for assigning resources to the UAV-UE 130 that also broadcasts its UL transmission information to the surrounding base stations 112. Such UL transmission information may include the spectral resources that will be used by the UAV-UE 130. For example, the UL transmission information may include the intended frequency band for the UL transmissions to the first base station 110. In addition, the UL transmission information shared with the surrounding base stations may also include the power level for the transmitter of the UAV-UE 130, the duration of the transmission, and/or other information may also be included with the broadcasted UL transmission information.

In operation, the UAV-UE 130 and the first base station 110 may communicate UL data by establishing communication using a scheduling request (SR) structure. The second base station 112 may also communicate UL data with other UEs 122 within its cell area. These calls may also be established by a SR structure. In order to avoid interference in the same frequency band, the UAV-UE 130 may communicate broadcast signals to the second base station 112 (and other neighboring base stations). These broadcast signals may be transmitted without the SR and grant structure. To allow a grant-free transmission of these broadcast signals, embodiments of the disclosure may also implement a spread spectrum technique for transmission of the broadcast signals. By assigning a sufficiently large processing gain to the spread spectrum signals, the spread spectrum signals may minimally affect the normal communications between other UEs and base stations within the network. This spread spectrum channel may be referred to herein as an underlay broadcast channel (UBC). The UBC may also be referred to in some embodiments as an underlay control channel. The surrounding base stations that receive and decode the underlay signals over the UBC to obtain the scheduling information for the respective UE located within the cell of another base station. This scheduling information may then be used by the surrounding base stations to schedule their own terrestrial UEs and/or UAV-UEs to reduce the effect of the interference by the UAV-UE 130 UL data transmissions to its own base station.

Embodiments of the disclosure contemplate multiple approaches to transmit over the UBC such that a maximum number of the neighboring base stations may receive the UBC transmission. The network configures the UAV-UE 130 when to transmit their respective UBC transmission over the UBC and set this as a network system parameter. This helps the neighboring base station 112 to be aware of the time-slots during which they should expect the UBC transmissions. As part of this configuration, the serving base station 110 may request the UAV-UE 130 to transmit the UBC transmission and the receiving base station 112 may make use of the spread spectrum signals as a test signal to evaluate the interference level that the UAV-UE 130 will impose to the surrounding base station 112 and other UEs (e.g., second UE 122) within the cell.

Embodiments of the present disclosure also include a UAV-UE including a transmitter configured to generate a spread spectrum waveform for the UBC transmission that is received and demodulated by the receiver within a base station. The waveform may be referred to herein as CP-DSSS because the waveform may be based on the direct sequence spread spectrum (DSSS) modulation that adds a cyclic prefix (CP) to each signal packet/frame (see FIG. 2) to keep the waveform compatible with the OFDM signals that are used for broadband communications in the network. The presence of CP may also simplify the information detection without estimating the channel impulse response. Details of the packet format and data detection in CP-DSSS signaling method in addition to how this signaling method may be used as a test signal for measurement of the interference level that UAV-UEs may introduce to the terrestrial network are discussed below. In some embodiments, each packet may include a single OFDM symbol frame. In some embodiments, each packet may be spread across a plurality of OFDM symbol frames. In some embodiments, each packet of the DSSS packets may include at least one reference bit and information bits. The at least one reference bit may be present in a single OFDM symbol frame, or the reference bit may include multiple reference bits present across multiple OFDM symbol frames.

Although examples herein are described for the case where CP-DSSS is used for UBC transmissions, it is contemplated that CP-DSSS is one possible signaling method for grant-free broadcast of information by UAV-UEs. Additional spread spectrum modulation techniques are also contemplated and included within the scope of this disclosure.

Referring now to the signaling portion of FIG. 1, the UAV-UE 130 located within the cell of the first base station 110 may send a scheduling request to the first base station 110 in operation 150. The first base station 110 may also grant the scheduling request at operation 152 before transmitting UL data at operation 162. Thus, the first base station 110 may act as the serving base station for communication of the UAV-UE 130 as well as other UEs 120 within its cell. The signaling for communication between the first UE 120 and the first base station 110 is not shown for simplicity, but it should be understood that the first base station 110 may also communicate with the first UE 120 using a SR structure as well.

The UAV-UE 130 may also send an underlay broadcast signal to the second base station 112 (and other neighboring base stations detected within its range) at operation 154. As discussed above, the underlay broadcast signal may include the UL transmission information for communication between the UAV-UE 130 and the first base station 110, such as the frequency band, power level for the transmitter, the duration of the transmission, timing information, etc.

The second base station 112 may receive the underlay broadcast and determine the interference level that the UAV-UE 130 will impose to the second base station 112 and its communication with the UEs within its cell. Responsive to this determination, the second base station 112 may be configured to take actions in the scheduling or otherwise management of communication with the UEs and/or UAV-UEs within its own cell to reduce the effect of the interference by the UAV-UE 130 UL data transmissions. For example, the second base station may avoid using the UL resource (e.g., frequency band) indicated in the UBC broadcast signal or assign different UE spatial characteristics for communication within its cell.

At some point in time, the second UE 122 located within the cell of the second base station 112 may request communication with the second base station 112. At operation 156, a schedule request may be sent from the second UE 122 to the second base station 112. The second base station 112 may also grant the scheduling request at operation 158 before transmitting UL data at operation 160. Thus, the second base station 112 may act as the serving base station for communication of the second UE 122. The UL resources (e.g., frequency band) issued to the second UE 122 by the second base station 112 may be based, at least in part, on the determination of the second base station 112 regarding the interference caused by the UAV-UE 130 communicating with the first base station 110.

In the example shown in FIG. 1, it is noted that the specific order and/or timing of some of the signaling may be different than shown. For example, the second UE 122 may have sent the schedule request to the second base station 112 prior to the second base station 112 having received the underlay broadcast signal. In such a situation, the grant of the schedule request may not yet have issued when the underlay broadcast signal was received. In another situation, the grant of the schedule request may have already issued and the UL data from the second UE 122 and the second base station 112 may be ongoing. As a result, the second base station 112 may modify (e.g., issuing a new grant signal) the UL resources (e.g., switching frequency bands) during such an ongoing call to account for the interference caused by the UAV-UE 130. In addition, although FIG. 1 may appear to imply that the operation 160 and the operation 162 occur at substantially the same time, it should be noted that this is not a requirement and may occur at different times.

1. CP-DSSS Message Construction and Information Recovery

The transmitter is configured to employ a DSSS technique for grant-free broadcasting of information messages from UAV-UEs 130 to neighboring base stations 112. Each message may have a length of one or more OFDM symbols. To simplify the process of message detection at the base station 112, the DSSS messages may be time synchronized with OFDM symbols that are used for normal communications in the network. Each DSSS message may carry a number of information bits. Furthermore, a cyclic prefix (CP) may be added to each message in the same form as in OFDM. The presence of CP in a broadcasted DSSS message, apart from making the DSSS message synchronized with the rest of the communications in the network, may also yield additional benefits that will be apparent from the description below.

To construct CP-DSSS messages, Zadoff-Chu (ZC) sequences may be employed by the transmitter as spreading gain vectors. ZC sequences are commonly used in LTE for channel estimation. ZC sequences, as implemented herein, serve a different function than is common to LTE that will be better understood with a brief review of the relevant properties of the ZC sequences.

1.1. ZC Sequences

A ZC sequence of length N represented by the column vector $z_0$ is used for the following example. A fundamental property of ZC sequences that is of interest for the embodiments herein is that input signal $z_0$ and its circularly shifted version $z_1, z_2, \ldots, z_{N-1}$ form a set of orthogonal basis vectors. By assuming these vectors are normalized to a length of unity, this property implies that, for any i and j, $$z_i^H z_j = \delta_{ij} \quad (1)$$

where $\delta_{ij}$ is the Kronecker delta function.

Next, for i and j in the range of 0 to N−L, and L<N, the pair of N×L circulant matrices Z is defined:

$$Z_i = [z_i z_{i+1} \ldots z_{i+L-1}] \quad (2)$$

and $$Z_j = [z_j z_{j+1} \ldots z_{j+L-1}] \quad (3)$$

and note that (1) implies that when |i−j|>L $$Z_i^H Z_j = 0 \quad (4)$$

where 0 is zero matrix with compatible size to the left side of the equation. Also, $$Z_i^H Z_i = Z_j^H Z_j = I \quad (5)$$

where I is the identity matrix. Furthermore, when |i−j|≤L, $Z_i^H Z_j$ is a diagonal matrix with zeros at its first |i−j| diagonal elements, and ones at its remaining diagonal elements.

Reference will also be made to the set of ZC sequences $z_0, z_1, \ldots, z_{N-1}$ and Z is used herein to denote this set of ZC sequences.

1.2. CP-DSSS Message Construction

In the situation of a UAV-UE interacting with a terrestrial network, each CP-DSSS message generated and sent by the UAV-UE to the base station may carry at least one reference bit and K information bits. For a user u, these bits are denoted by $b_{u,0}$ for the reference bit, and $b_{u,1}$ through $b_{u,K}$, for the information bits. The corresponding CP-DSSS message packet/frame is expressed as:

$$x_u = \sum_{k=0}^{K} b_{u,k} z_{u,k} \quad (6)$$

where $z_{u,k}$ are a set of spreading gain vectors that are chosen for the set Z and are specific to user u. A CP is added to $x_u$ before transmission.

Figure 2:
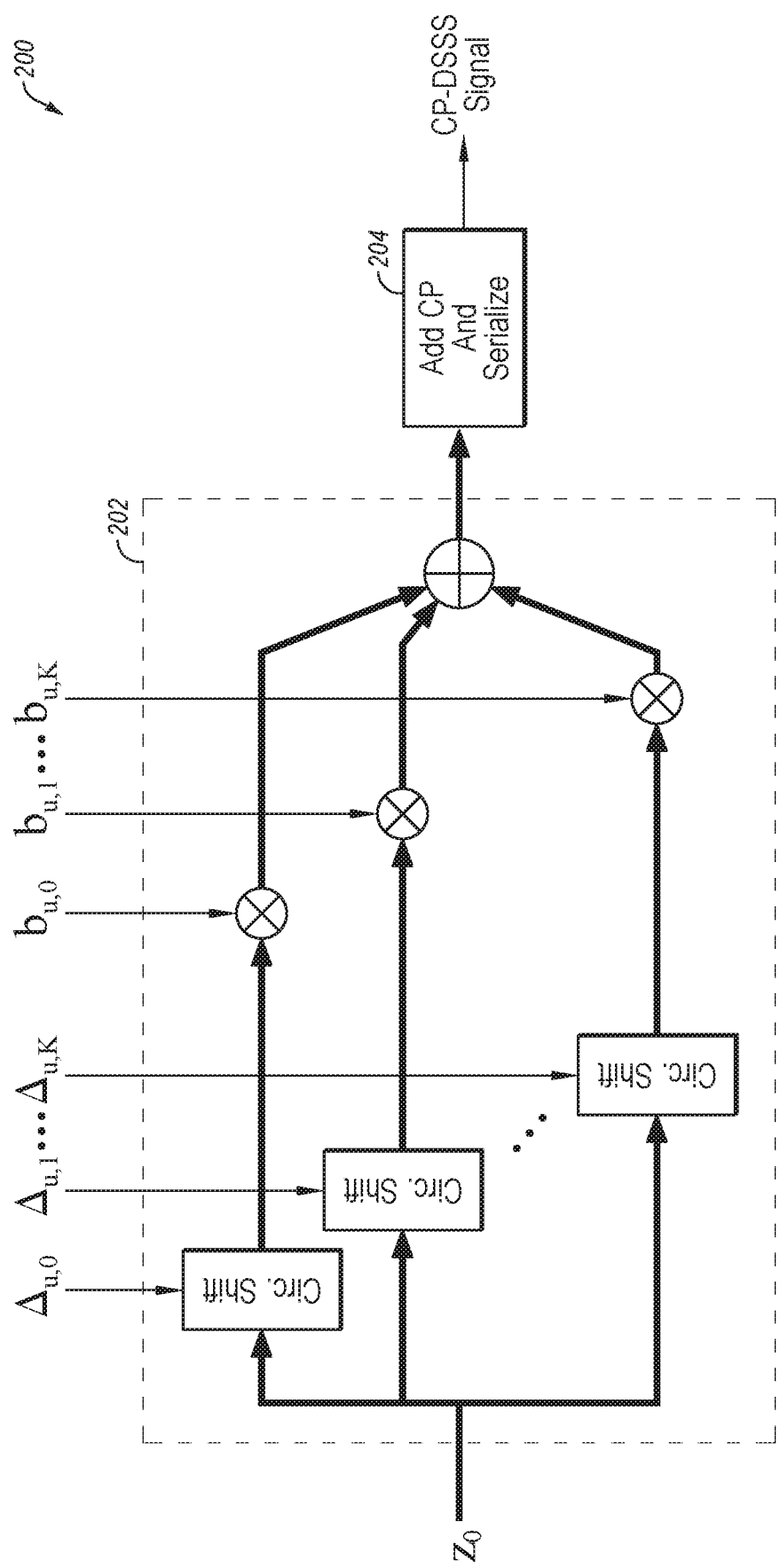
FIG. 2 is a block diagram illustrating the process of generation of a CP-DSSS signal vector $x_u$.

FIG. 2 is a block diagram illustrating the process 200 of generation of the DSSS signal vector $x_u$. The process 200 includes three inputs: 1) the seed ZC sequence vector $z_0$; 2) the information bits $b_{u,k}$, for k=1,2, . . . , K; and 3) the delay units $\Delta_{u,k}$, for k=0, 1, 2, . . . , K, associated with the reference bit $b_{u,0}$ and the information bits $b_{u,k}$, for k=1, 2, . . . , K. As shown, for the reference bit $b_{u,0}$ and each of the information bits, $b_{u,k}$, the seed vector $z_0$ is passed to a circular shifter block 202 that modifies $z_0$ according to the shift parameter $\Delta_{u,k}$. The results of these circular shifts are then scaled by the reference bit and the information bits and added together. The result is the constructed signal vector $x_u$. A CP 204 is added to $x_u$ and the result is serialized as the transmit signal (CP-DSSS signal). This process may repeated at all UAV-UE nodes that have a message to transmit to a base station or a set of base stations.

At the BS, after removing CP, the base station will receive the received signal vector:

$$y = \sum_{u=1}^{U} \left( \sum_{k=0}^{K} b_{u,k} z_{u,k} \right) h_u + v \quad (7)$$

where $h_u$ is the size L×1 vector of channel impulse response between the uth UAV-UE and the BS, $Z_{u,k}$ are a set of circulant matrices that are constructed in the same way as $Z_i$ and $Z_j$, and v is the vector of noise plus interference from the normal communications in the network.

For those UAV-UEs that have not transmitted any message, $b_{u,k}$=0, for all k. Moreover, to allow straightforward extraction of the reference and information bits $b_{u,k}$ from (7), the spreading gain vectors $z_{u,k}$ are chosen such that the index numbers associated with them are at least L+1 points apart from one another.

Imposing this condition, and recalling (4) and (5), results in:

$$Z_{u,i}^H Z_{u,j} = \begin{cases} I, & i = j \\ 0, & i \neq j \end{cases} \quad (8)$$

To avoid interference among the information bits from different UAV-UEs that may transmit messages simultaneously, the spreading gain vectors of all users may be selected such that:

$$Z_{u_1,i}^H Z_{u_2,j} = 0 \quad (9)$$

for any UAV-UE pair $u_1 \neq u_2$ and all values of i and j.

1.3. Information Recovery

Pre-multiplying (7) with $Z_{u,i}^H$ and using (8) results in:

$$y_{u,i} = b_{u,i} h_u + v_{u,i}, \text{ for } i=0,1,2,\ldots,K \quad (10)$$

where $y_{u,i} = Z_{u,i}^H y$ and $v_{u,i} = Z_{u,i}^H v$. One may recognize that pre-multiplying (7) with $Z_{u,i}^H$ may effectively be a dispreading step. As a result, the set of matrices $Z_{u,i}^H$, for different choices of u and i may be referred to as "dispreading matrices."

It should be noted that possible interference has been ignored from other UAV-UEs in case (9) does hold and they are transmitting simultaneously. This interference has been ignored because such interference is unlikely to happen and with a good design it can be kept at a minimal level, even when such interference does happen.

With the reference bit $b_{u,0}$ set equal to +1, estimates of the information bits are obtained as:

$$\hat{b}_{u,i} = \text{sgn}[\Re[y_{u,0}^H y_{u,i}]], \text{ for } i=1,2,\ldots,K \quad (11)$$

where $\Re[\cdot]$ and $\text{sgn}[\cdot]$ denote the real part and the signum of the argument.

Alternatively:

$$\hat{b}_{u,i} = \Re[y_{u,0}^H y_{u,i}], \text{ for } i=1,2,\ldots,K \quad (12)$$

may be a set of soft estimates of the information bits which may then be passed to a soft decoder for information recovery.

Figure 3:
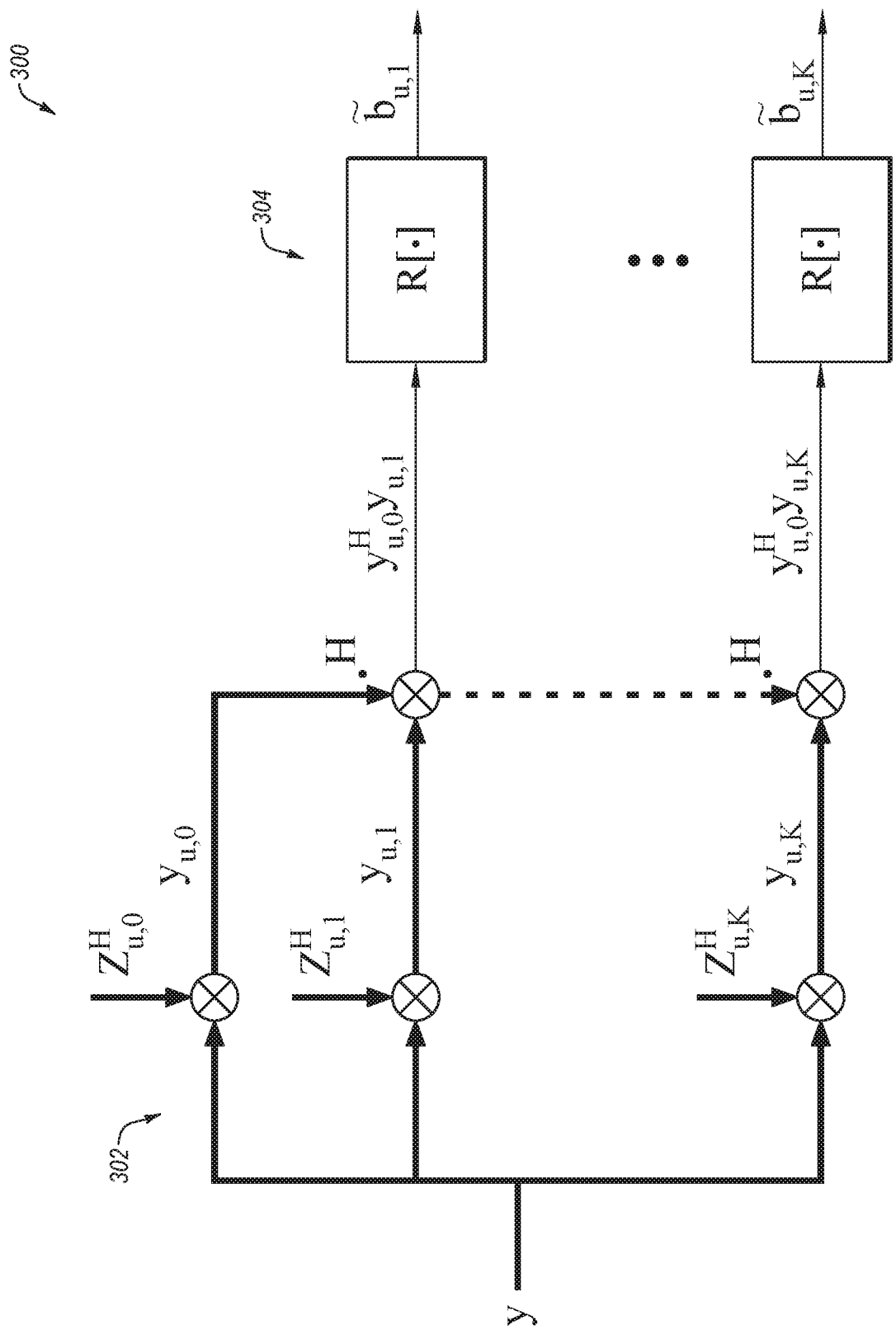
FIG. 3 is a block diagram illustrating a process of information recovery of a packet in the UBC communication according to an embodiment of the disclosure.

FIG. 3 is a block diagram illustrating a process 300 of information recovery of a packet in the UBC communication according to an embodiment of the disclosure. After removal of CP from a signal packet/frame, the result y is received as the input signal for information recovery. Before information recovery, one should identify whether the signal y carriers a UBC/CP-DSSS signal of any of the UAV-UE users. Details of this step, which is referred to as CP-DSSS signal detection, are presented in the next subsection with respect to FIG. 4.

Assuming that the CP-DSSS signal detection identifies y carries a UBC from the user u, the steps shown in FIG. 3 are performed. These steps are: 1) the vector y is received by a pre-multiplication block 302 with $Z_{u,i}^H$, for i=0, 1, . . . , K. This gives the set of equations (10); 2) the inner products $y_{u,0}^H y_{u,i}$, for i=1, . . . , K, are calculated; and 3) the real parts of the results from Step 2 are the soft values of the transmitted bits $b_{u,i}$, for i=1, . . . , K from the extraction block 304. The extraction block 304 may be hard decoded by taking their sign or may be passed to a soft decoder for extraction of the coded information bits. It is noted that due to the construction of the transmitted CP-DSSS signal, information recovery may be performed without estimating the channel impulse response, which may further simplify the receiver implementation.

1.4. CP-DSSS Signal Detection

The information recovery steps discussed above with respect to FIG. 3 assume the base station is aware that one of the UAV-UEs has sent a message over the UBC. As a result, prior to information recovery, the base station may be configured to take an action to identify which UAV-UEs have transmitted messages, if any. To detect whether a message has been transmitted by the uth UAV-UE, the base station may recall the set of equations in (10) and determine if no message has been transmitted $b_{u,i} = 0$, for i=0, 1, . . . , N−1, otherwise, $b_{u,i}$s are a set of random binary numbers taking values of ±1. Next, the set of random variables may be generated:

$$c_{i,j}^{(u)} = |\Re[y_{u,i}^H y_{u,j}]| \quad (13)$$

for all pairs of i≠j in the range of 0 to K.

Under the hypothesis $H_0$, when no message has been transmitted by the uth UAV-UE, $c_{i,j}^{(u)}$ are a set of random variables of the form $|\Re[v_{u,i}^H v_{u,j}]|$. These random variables may be concentrated near zero. On the other hand under the hypothesis $H_1$, when a message has been transmitted by the UAV-UE, $c_{i,j}^{(u)}$ are a set of random variables whose distribution is significantly different from the case of $H_0$. This is because of presence of the positive term $h_u^H h_u$ in the expansion of (13) (see equation (14), below) which biases the results to some values that are significantly distanced from zero. Accordingly, the presence or absence of a particular message can be examined by evaluating the $c_{i,j}^{(u)}$ values under the hypotheses $H_0$ and $H_1$.

Figure 4:
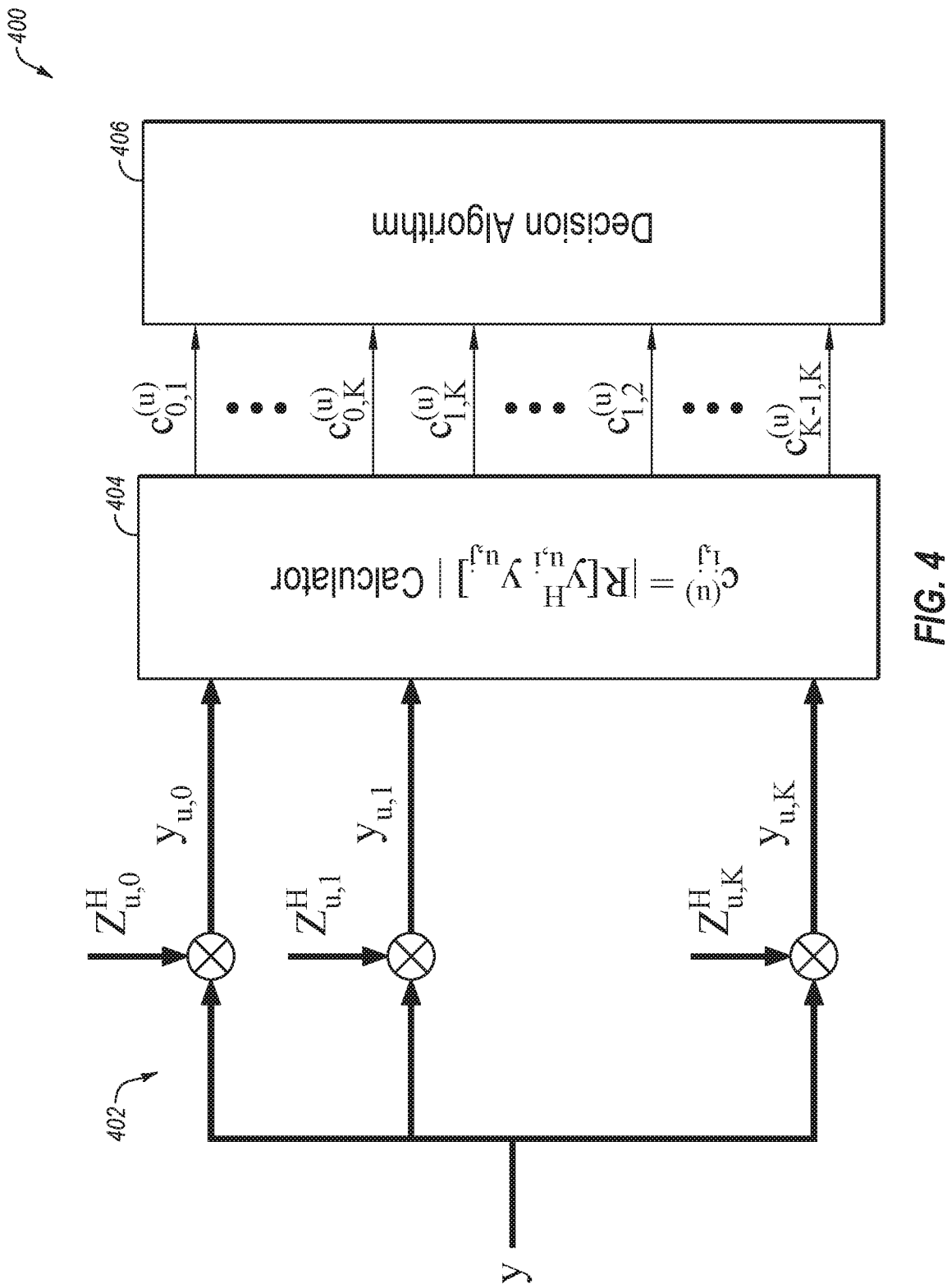
FIG. 4 is a simplified block diagram illustrating a process of detecting a CP-DSSS signal being received from a UAV according to an embodiment of the disclosure.

FIG. 4 is a simplified block diagram illustrating a process 400 of detecting a CP-DSSS signal being received from a UAV-UE according to an embodiment of the disclosure. The pre-multiplication block 402 of this process is common with the pre-multiplication block 302 in the information recovery part of the system presented in FIG. 3. In the next step, the set of random variables $c_{i,j}^{(u)}$, as defined in (13), are calculated by block 404 and passed to the decision algorithm block 406. In the decision algorithm block 406, the random variables $c_{i,j}^{(u)}$ are compared against a threshold that relates to the power of the input signal y and is based on some criteria that keep the probability of false alarm (i.e., detection of a CP-DSSS signal when no signal has been transmitted) at a minimal level. This minimal level is a system parameter that may be selected based on a predetermined performance characteristic.

1.5. Increasing the Length of the Messages

Because each OFDM symbol interval is limited in duration, each CP-DSSS frame (i.e., one OFDM symbol interval including multiple QAM symbols), as defined herein, can accommodate a limited number of information bits for each message. To allow longer messages, a long message may be divided into many small segments/subframes and then transmitted over successive OFDM symbols. Each segment/subframe is transmitted over an OFDM symbol interval. Such long messages may include a single reference bit for all the information bits across multiple CP-DSSS subframes, each of length one OFDM symbol interval (when the channel $h_u$ is slowly varying and, thus, may be assumed fixed over successive OFDM symbols) or an independent reference bit can be added to each CP-DSSS subframe (when the channel variation between successive OFDM symbols may be significant). In both cases, equations similar to those in equation (10) are obtained after pre-multiplying the received CP-stripped CP-DSSS subframes with the set of dispreading matrices $Z_{u,i}^H$, and for relevant choices of the index i. As a result, the subsequent steps discussed after equation (10) for detection of the presence of a CP-DSSS signal and then detection of the transmitted information can follow similarly.

An alternative method that may be adopted for transmission of longer messages is to use CP-DSSS messages that extend over multiple OFDM symbol intervals. For example, over a slot consisting of 7 OFDM symbols, or over a mini-slot consisting of 2 or 4 OFDM symbols (as discussed in 3GPP LTE). Adopting such longer messages, besides allowing transmission of more information bits, are beneficial as they lead to a larger processing gain. This may also enable reducing the power spectral density of the generated CP-DSSS messages, and reducing the interference to the rest of the network. Because boundaries of slots/mini-slots may be known to the network, the network synchronization with the generated CP-DSSS messages remains trivial.

1.6. Evaluating the Interference Level of UAV-UEs to Adjacent Cells

While CP-DSSS signal transmission through UBC is designed to have a power spectral density level that minimally interfere with normal communications in the network, a CP-DSSS signal may be used as a test signal to obtain an estimate of the interference level of the overlay data signals that later will be transmitted by the respective UAV-UE to the adjacent cells.

When the uth UAV-UE has transmitted a message:

$$y_{u,i}^H y_{u,j} = b_{u,i} b_{u,j} h_u^H h_u + b_{u,i} h_u^H v_{u,j} + b_{u,j} v_{u,i}^H h_u + v_{u,i}^H v_{u,j}. \quad (14)$$

In the absence of the message, (14) reduces to $$y_{u,i}^H y_{u,j} = v_{u,i}^H v_{u,j}. \quad (15)$$

Accordingly, using the mean value of the set of random variables:

$$c_{i,j}^{(u)} = \quad (16)$$
$$|\mathbb{R}[y_{u,i}^H y_{u,i}]| = |\mathbb{R}[h_u^H h_u + b_{u,j} h_u^H v_{u,j} + b_{u,i} v_{u,i}^H h_u + b_{u,i} b_{u,j} v_{u,i}^H v_{u,j}]| \approx$$
$$|h_u^H h_u + \mathbb{R}[b_{u,j} h_u^H v_{u,j} + b_{u,i} v_{u,i}^H h_u + b_{u,i} b_{u,j} v_{u,i}^H v_{u,j}]|$$

for all pairs of (i,j), an estimate of the non-zero bias $h_u^H h_u$ may be obtained.

The quantity $h_u^H h_u$ may directly relate to the channel gain between the transmitting UAV-UE and the receiving base station, and assuming that the UAV-UE transmits its overlay data signal at a certain dB level above the UBC signal, the receiving base station may be configured to estimate the interference level of the overlay data signals.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the invention as hereinafter claimed, including legal equivalents thereof. In addition, features from one embodiment may be combined with features of another embodiment while still being encompassed within the scope of the invention. Further, embodiments of the disclosure have utility with different and various detector types and configurations.

What is claimed is:

1. An unmanned aerial vehicle including a processor and at least one transmitter configured to:
   communicate a scheduling request to a first base station within a first cell; and
   communicate its uplink (UL) transmission information over an underlay broadcast channel with at least one neighboring base station within another cell, wherein the underlay broadcast channel has a power level below a noise level for a communication spectrum;
   wherein the UL transmission information is communicated to the at least one neighboring base station after communicating the scheduling request and prior to any communication of UL data from the at least one transmitter to the first base station.

2. The unmanned aerial vehicle of claim 1, wherein processor and the at least one transmitter are further configured to generate the UL transmission information as spread spectrum signals.

3. The unmanned aerial vehicle of claim 2, wherein the UL transmission information includes spectral resources to be used by the unmanned aerial vehicle when communicating with the first base station.

4. The unmanned aerial vehicle of claim 3, wherein the spectral resources include a band of transmission for communication with the first base station.

5. The unmanned aerial vehicle of claim 3, wherein the spectral resources include a signal power level for data packets during transmission when communicating with the first base station.

6. The unmanned aerial vehicle of claim 3, wherein the spectral resources include a duration of time for data packets during transmission when communicating with the first base station.

7. The unmanned aerial vehicle of claim 2, wherein the spread spectrum signals are direct sequence spread spectrum (DSSS) packets.

8. The unmanned aerial vehicle of claim 7, wherein the DSSS packets are cycle prefix DSSS (CP-DSSS) packets.

9. The unmanned aerial vehicle of claim 7, wherein each packet is spread across a single OFDM symbol frame.

10. The unmanned aerial vehicle of claim 7, wherein each packet is spread across a plurality of OFDM symbol frames.

11. The unmanned aerial vehicle of claim 7, wherein each packet of the DSSS packets includes at least one reference bit and information bits.

12. The unmanned aerial vehicle of claim 11, wherein the at least one reference bit is present in a single OFDM symbol frame.

13. The unmanned aerial vehicle of claim 12, wherein the at least one reference bit includes multiple reference bits present across multiple OFDM symbol frames.

14. The unmanned aerial vehicle of claim 7, wherein a packet of the DSSS packets includes a single reference bit for the packet and other packets of the DSSS packets, wherein the other packets include multiple information bits without their own reference bit.

15. The unmanned aerial vehicle of claim 1, wherein the UL transmission information is transmitted as grant-free broadcasts of information with the at least one neighboring base station.

16. A communication system, comprising:
   a number of base stations; and
   an unmanned aerial vehicle configured to:
      communicate a scheduling request with a first base station of the number of base stations within a first cell; and
      communicate associated uplink (UL) transmission information over an underlay broadcast channel with at least a second base station of the number of base stations within another cell, wherein the underlay broadcast channel has a power level below a noise level for a communication spectrum;
      wherein the UL transmission information is communicated to the at least the second base station after communicating the scheduling request and prior to any communication of UL data from the unmanned aerial vehicle to the first base station.

17. The communication system of claim 16, wherein the UL transmission information includes spread spectrum signals.

18. The communication system of claim 16, wherein the UL transmission information includes spectral resources to be used by the unmanned aerial vehicle when communicating with the first base station.

19. A method of operating a communication system, comprising:
   communicating, from an unmanned aerial vehicle, a scheduling request to a first base station within a first cell; and
   communicating, from the unmanned aerial vehicle, associated uplink (UL) transmission information over an underlay broadcast channel to at least a second base station within another cell, wherein the underlay broadcast channel has a power level below a noise level for a communication spectrum, wherein the UL transmission information is communicated to the at least the second base station after communicating the scheduling request and prior to any communication of UL data from the unmanned aerial vehicle to the first base station.

20. The method of claim 19, wherein communicating UL transmission information comprises communicating grant-free broadcasts of information with the at least the second base station.

\* \* \* \* \*

UNITED STATES PATENT AND TRADEMARK OFFICE
CERTIFICATE OF CORRECTION

Page 1 of 2

PATENT NO. : 10,912,059 B2
APPLICATION NO. : 16/144153
DATED : February 2, 2021
INVENTOR(S) : Hussein Moradi and Behrouz Farhang It is certified that error appears in the above-identified patent and that said Letters Patent is hereby corrected as shown below:

In the Specification

| | | |
|---|---|---|
| Column 7, | Line 50, | change "i and j" to --$i$ and $j$-- and change "N–L, and L<N," to --$N$–$L$, and $L$<$N$,-- |
| Column 7, | Line 51, | change "N×L" to --$N$×$L$-- |
| Column 7, | Line 58, | change "\|i–j\|>L" to --$\|i-j\|$>$L$-- |
| Column 7, | Line 65, | change "\|i–j\|≤L," to --$\|i-j\|$≤$L$,-- |
| Column 7, | Line 66, | change "\|i–j\|" to --$\|i-j\|$-- |
| Column 8, | Line 26, | change "$b_{u,k}$, for k=1,2, . . . , K;" to --$b_{u,k}$, for $k$=1, 2, . . . , $K$;-- |
| Column 8, | Line 27, | change "k=0, 1, 2, . . . , K," to --$k$=0, 1, 2, . . . , $K$,-- |
| Column 8, | Line 28, | change "$b_{u,0}$" to --$b_{u,0}$-- and change "$b_{u,k}$, for k=1, 2, . . . , K." to --$b_{u,k}$, for $k$=1,2, . . . , $K$.-- |
| Column 8, | Line 29, | change "$b_{u,0}$" to --$b_{u,0}$-- |
| Column 8, | Line 30, | change "$b_{u,k}$," to --$b_{u,k}$,-- |
| Column 8, | Line 55, | change "$b_{u,k}$" to --$b_{u,k}$-- |
| Column 8, | Line 56, | change "$b_{u,k}$" to --$b_{u,k}$-- |
| Column 8, | Line 58, | change "L+1" to --$L$+1-- |
| Column 9, | Line 5, | change "$Z_{u_1,i}{}^H Z_{u_2,j}$=0," to --$\mathbf{Z}_{u_1,i}^H \mathbf{Z}_{u_2,j} = \mathbf{0}$-- |
| Column 9, | Line 7, | change "u₁ ≠ u₂" to --$u_1 \neq u_2$-- |
| Column 9, | Line 9, | change "$Z_{u,i}{}^H$" to --$\mathbf{Z}_{u,i}^H$-- |
| Column 9, | Line 12, | change "$y_{u,i}$=$Z_{u,i}{}^H$y and $v_{u,i}$=$Z_{u,i}{}^H$v." to --$\mathbf{Z}_{u,i}^H \mathbf{y}$ and $\mathbf{v}_{u,i} = \mathbf{Z}_{u,i}^H \mathbf{v}$.-- |
| Column 9, | Line 13, | change "$Z_{u,i}{}^H$" to --$\mathbf{Z}_{u,i}^H$-- |
| Column 9, | Line 14, | change "$Z_{u,i}{}^H$," to --$\mathbf{Z}_{u,i}^H$,-- |
| Column 9, | Line 15, | change "u and i" to --$u$ and $i$-- |
| Column 9, | Line 23, | change "$b_{u,0}$" to --$b_{u,0}$-- |

Signed and Sealed this
Thirtieth Day of March, 2021

Drew Hirshfeld
*Performing the Functions and Duties of the
Under Secretary of Commerce for Intellectual Property and
Director of the United States Patent and Trademark Office*

CERTIFICATE OF CORRECTION (continued)

| | | |
|---|---|---|
| Column 9, | Line 25, | change "$\hat{b}_{u,i}=\text{sgn}[\Re[y_{u,0}{}^H y_{u,i}]]$, for $i=1,2,\ldots,K$," to --$\hat{b}_{u,i} = \text{sgn}\left[\Re[\mathbf{y}_{u,0}^H \mathbf{y}_{u,i}]\right]$, for $i = 1, 2, \cdots, K$-- |
| Column 9, | Line 30, | change "$\tilde{b}_{u,i}=\Re[y_{u,0}{}^H y_{u,i}]$, for $i=1,2,\ldots,K$" to --$\tilde{b}_{u,i} = \Re[\mathbf{y}_{u,0}^H \mathbf{y}_{u,i}]$, for $i = 1, 2, \cdots, K$-- |
| Column 9, | Line 47, | change "$Z_{u,i}{}^H$, for i=0, 1, $\ldots$, K." to --$\mathbf{Z}_{u,i}^H$, for --$i=0, 1, \ldots, K$.-- |
| Column 9, | Line 49, | change "$y_{u,0}{}^H y_{u,i}$, for i=1, $\ldots$, K," to --$\mathbf{y}_{u,0}^H \mathbf{y}_{u,i}$, for $i=1, \ldots, K$,-- |
| Column 9, | Line 51, | change "$b_{u,i}$, for i=1, $\ldots$, K" to --$b_{u,i}$, for $i=1, \ldots, K$,-- |
| Column 10, | Lines 1-2, | change "$b_{u,i}=0$, for i=0, 1, $\ldots$, N-1, otherwise, $b_{u,i}$s" to --$b_{u,i}=0$, for $i=0, 1, \ldots, N-1$, otherwise, $b_{u,i}$s-- |
| Column 10, | Line 6, | change "$c_{i,j}{}^{(u)}=|\Re[y_{u,i}{}^H y_{u,j}]|$," to --$c_{i,j}^{(u)} = \left|\Re[\mathbf{y}_{u,i}^H \mathbf{y}_{u,j}]\right|$-- |
| Column 10, | Line 7, | change "i≠j" to --$i \neq j$-- |
| Column 10, | Line 9, | change "$c_{i,j}{}^{(u)}$" to --$c_{i,j}^{(u)}$-- |
| Column 10, | Line 10, | change "$|\Re[v_{u,i}{}^H v_{u,j}]|$." to --$\left|\Re[\mathbf{v}_{u,i}^H \mathbf{v}_{u,j}]\right|$.-- |
| Column 10, | Line 11, | change "other hand" to --other hand,-- |
| Column 10, | Line 13, | change "$c_{i,j}{}^{(u)}$" to --$c_{i,j}^{(u)}$-- |
| Column 10, | Line 15, | change "$h_u{}^H h_u$" to --$\mathbf{h}_u^H \mathbf{h}_u$-- |
| Column 10, | Line 19, | change "$c_{i,j}{}^{(u)}$" to --$c_{i,j}^{(u)}$-- |
| Column 10, | Line 27, | change "$c_{i,j}{}^{(u)}$," to --$c_{i,j}^{(u)}$,-- |
| Column 10, | Line 30, | change "$c_{i,j}{}^{(u)}$" to --$c_{i,j}^{(u)}$-- |
| Column 10, | Line 56, | change "$Z_{u,i}{}^H$," to --$\mathbf{Z}_{u,i}^H$,-- |
| Column 11, | Line 18, | change "$y_{u,i}{}^H y_{u,j}=b_{u,i}b_{u,j}h_u{}^H h_u+b_{u,i}h_u{}^H v_{u,j}+b_{u,j}v_{u,i}{}^H h_u+v_{u,i}{}^H v_{u,j}$," to --$\mathbf{y}_{u,i}^H \mathbf{y}_{u,j} = b_{u,i}b_{u,j}\mathbf{h}_u^H \mathbf{h}_u + b_{u,i}\mathbf{h}_u^H \mathbf{v}_{u,j} + b_{u,j}\mathbf{v}_{u,i}^H \mathbf{h}_u + \mathbf{v}_{u,i}^H \mathbf{v}_{u,j}$.-- |
| Column 11, | Line 21, | change "$y_{u,i}{}^H y_{u,j}=v_{u,i}{}^H v_{u,j}$." to --$\mathbf{y}_{u,i}^H \mathbf{y}_{u,j} = \mathbf{v}_{u,i}^H \mathbf{v}_{u,j}$.-- |
| Column 11, | Line 32, | change "(i,j)," to --$(i,j)$,-- and change "$h_u{}^H h_u$" to --$\mathbf{h}_u^H \mathbf{h}_u$-- |
| Column 11, | Line 34, | change "$h_u{}^H h_u$" to --$\mathbf{h}_u^H \mathbf{h}_u$-- |